Patented Sept. 11, 1934

1,973,636

UNITED STATES PATENT OFFICE 1,973,636

MANUFACTURE OF AZO-DYESTUFFS CONTAINING SULPHUR FROM DIAZOTIZED ORTHOAMINOPHENOLS

Robert Lantz, Paris, France, assignor of one-half to Societe Anonyme des Matieres Colorantes & Produits Chimiques de Saint-Denis, Paris, France No Drawing. Application June 11, 1931, Serial No. 543,747. In France June 20, 1930

17 Claims. (Cl. 260—91)

This invention relates to the manufacture of dyestuffs by coupling a diazotized orthoaminophenol which may or may not contain substituents, with an azo-component containing at least one disulphide or one trisulphide group that is to say either two atoms of sulphur grouped as follows: —S—S—, or three atoms of sulphur grouped as follows: —S—S—S—. The dyestuffs thus obtained are capable of being absorbed by cotton in a sulphide bath. The dyeings produced on the fibre by means of the dyestuffs may be treated with metal salts whereby they may acquire remarkable properties of fastness.

The following examples illustrate the invention the parts being by weight:

Example 1.—7.2 parts of 4-nitro-2-amino-1-phenol whose structural formula is:

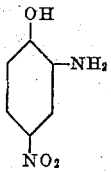

are dissolved in 18 parts of commercial hydrochloric acid and 200 parts of water and there are added 3.5 parts of a solution of sodium nitrite of 10 per cent. strength so that there is present an excess of nitrous acid. The diazo solution thus prepared is introduced into a solution containing 15 parts of the dithioanilide of β-hydroxynaphthoic acid, (which may be made in the manner described in Example 3 of my U. S. patent application No. 543,746, and whose structural formula is:

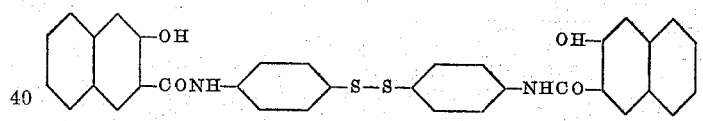

dissolved in 35 parts of caustic soda solution of 40° Bé., 150 parts of water and 120 parts of alcohol. The dyestuff separates in the form of a black precipitate which is filtered and washed with water.

The para-para'-dithioanilide of β-hydroxynaphthoic acid may be coupled in an analogous manner with various diazotized orthoaminophenols, such as chloro-orthoamino, picramic acid whose structural formula is:—

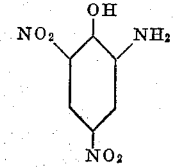

or the like.

Example 2.—22 parts of ortho-aminophenol whose structural formula is:—

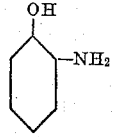

are dissolved in 70 parts of hydrochloric acid of 22° Bé. and 600 parts of water and diazotized at about 0° C. by the addition of 150 parts of a solution of sodium nitrite of 10 per cent strength. The diazo solution thus prepared is introduced into a solution of 35 parts of bis (2 hydroxynaphthyl 6) disulphide whose structural formula is:

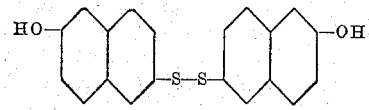

(Zincke et Dereser Ber. 51, 1918, page 357) in 280 parts of caustic soda solution of 40° Bé. and 1200 parts of water. Coupling occurs slowly yielding a dark violet-blue dyestuff the whole is allowed to stand overnight and the dyestuff is then separated by filtration.

Example 3.—16 parts of 4-chloro-2-amino-1-phenol whose structural formula is:

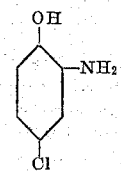

are dissolved in 36 parts of hydrochloric acid and 200 parts of water and diazotized by the addition of 70 parts of a solution of sodium nitrite of 10 per cent strength. The diazo solution is introduced into 20 parts of trisulphide of α-naphthol whose formula is $(C_{10}H_7OH)_2S_3$ and whose structural formula is not known; (Watson and Dutt, Journ. Chem. Soc. 121 p. 2418-9), dissolved in 70 parts of caustic soda solution of 44° Bé. and 400 parts of water. Precipitation of the dyestuff occurs rapidly; it is separated by filtration.

The properties of a number of dyestuffs obtainable in accordance with the invention are indicated in the following table:

| Diazo compound of | Azo component | Color of the dyestuff powder | Color of solution in sodium sulphide solution | Color of solution in sulphuric acid |
| --- | --- | --- | --- | --- |
| Chloro-ortho-aminophenol | Para-para'-di-thioanilide of β-hydroxynaphthoic acid. | Bluish-black | Red | Blue. |
| Nitro-ortho-aminophenol | ...do... | Greenish-black | Violet | Violet. |
| Picramic acid | ...do... | Black | ...do... | Vivid red-purple. |
| Ortho-amino-phenol | Bis (2 hydroxy-naphthyl 6) disulphide. | Bluish-black | Blue | Red-purple. |
| Chloro-ortho-aminophenol | Trisulphide of α-naphtho | Reddish-black | Red | Purple-grey. |

What I claim is:

1. A method of manufacturing azo-dyestuffs which comprises diazotizing 4-chloro-2-amino-1-phenol, introducing the diazo solution thus prepared into a solution of trisulphide of α-naphthol in caustic soda and water and separating by filtration the precipitated dyestuff.

2. A method of manufacturing azo-dyestuffs which comprises coupling a diazotized aromatic amine having an hydroxy-group in the ortho position with respect to the amino-group with an azo-component the molecule of which contains at least one group $S_n$, $n$ being an integer greater than 1 and smaller than 4.

3. A method of manufacturing azo-dyestuffs which comprises coupling a diazotized aromatic amine having an hydroxy-group in the ortho position with respect to the amino group with an azo component the molecule of which comprises one group $S_n$, $n$ being an integer greater than 1 and smaller than 4.

4. A method of manufacturing azo-dyestuffs which comprises coupling a diazotized aromatic amine having a hydroxy-group in the ortho position with respect to the amino group with an azo component the molecule of which comprises a group S—S.

5. A method of manufacturing azo-dyestuffs which comprises coupling a diazotized aromatic amine having a hydroxy-group in the ortho position with respect to the amino-group with para-para'-dithioanilide of β-hydroxynaphthoic acid.

6. A method of manufacturing azo-dyestuffs which comprises coupling diazotized nitro-ortho-aminophenol with para-para'-dithioanilide of β-hydroxynaphthoic acid.

7. A method of manufacturing azo-dyestuffs which comprises coupling a diazotized aromatic amine having a hydroxy-group in the ortho position with respect to the amino group with bis (2 hydroxynaphthyl 6) disulphide.

8. A method of manufacturing azo-dyestuffs which comprises coupling diazotized ortho-aminophenol with bis (2 hydroxynaphthyl 6) disulphide.

9. A method of manufacturing azo-dyestuffs which comprises coupling a diazotized aromatic amine having a hydroxy-group in the ortho position with respect to the amino group with an azo-component the molecule of which comprises a group —S—S—S—.

10. A method of manufacturing azo-dyestuffs which comprises coupling diazotized chloro-ortho-aminophenol with trisulphide of α-naphthol.

11. A method of manufacturing azo-dyestuffs which comprises coupling a diazotized aromatic amine having an hydroxy-group in the ortho position with respect to the amino group with trisulphide of α-naphthol.

12. Azodyestuffs formed by coupling a diazotized aromatic amine having a hydroxy-group in the ortho position with respect to the amino-group with an azo-component the molecule of which contains at least one group $S_n$, $n$ being an integer greater than 1 and smaller than 4, these azodyestuffs being capable of being absorbed by cotton and giving very fast dyeings when treated by metal salts.

13. Azodyestuffs formed by coupling a diazotized aromatic amine having a hydroxy-group in the ortho position with respect to the amino-group with an azo-component the molecule of which contains at least one group $S_n$, $n$ being an integer greater than 1 and smaller than 4, these azodyestuffs being soluble in sodium sulphide and sulphuric acid, being capable of being absorbed by cotton and similar materials and giving very fast dyeings when treated by metal salts.

14. Azodyestuffs formed by coupling a diazotized aromatic amine having a hydroxy-group in the ortho position with respect to the amino group with an azo-component the molecule of which contains at least one group $S_n$, $n$ being an integer greater than 1 and smaller than 4, these azodyestuffs forming blackish powders and being soluble in sodium sulphide, forming solutions the colors of which range between violet and red, and also soluble in sulphuric acid, forming solutions the colors of which range between violet and red.

15. As a new compound, the coupling product of diazotized nitro-ortho-aminophenol and para-para'-dithioanilide of β-hydroxynaphthoic acid, forming a greenish-black powder giving a violet solution in sodium sulphide and a violet solution in sulphuric acid.

16. As a new compound, the coupling product of diazotized ortho-aminophenol and bis (2 hydroxynaphthyl 6)-disulphide forming a bluish black powder giving a blue solution in sodium sulphide, and a red-purple solution in sulphuric acid.

17. As a new compound, the coupling product of diazotized chloro-ortho-aminophenol and trisulphide of α-naphthol forming a reddish-black powder giving a red solution in sodium sulphide and a purple-grey solution in sulphuric acid.

ROBERT LANTZ.